United States Patent [19]

Tsunoda et al.

[11] Patent Number: 5,458,913
[45] Date of Patent: Oct. 17, 1995

[54] COATING METHOD

[75] Inventors: Eizo Tsunoda, Komoro; Yutaka Shimizu, Saku; Naomi Yoshiike, Kitamimaki; Katsumi Onozawa, Saku; Kazuo Katai, Saku; Eiichi Watanabe, Saku, all of Japan

[73] Assignee: TDK Corporation, Tokyo, Japan

[21] Appl. No.: 360,282

[22] Filed: Dec. 21, 1994

[30] Foreign Application Priority Data

Dec. 28, 1993 [JP] Japan .................................. 5-349098

[51] Int. Cl.⁶ ..................................................... B05D 3/12
[52] U.S. Cl. ........................ 427/128; 427/209; 427/356; 427/358; 118/410; 118/411
[58] Field of Search .................................. 427/129, 130, 427/128, 209, 356, 358; 118/410, 411

[56]  References Cited

U.S. PATENT DOCUMENTS

| 4,796,557 | 1/1989 | Shibata et al. |
| 5,108,795 | 4/1992 | Shibata et al. ........................ 427/356 |
| 5,202,164 | 4/1993 | Takahashi et al. .................... 427/356 |

FOREIGN PATENT DOCUMENTS

| 0451863 | 10/1991 | European Pat. Off. |
| 3907846 | 9/1989 | Germany. |

OTHER PUBLICATIONS

Patent Abstracts of Japan, vol. 11, No. 307 (C–450), JP 62 095169, May 1, 1987.
English Abstract of Japanese Docket No. 62–95169, dated May 1, 1987.
English Abstract of Japanese Docket No. 02–229572, dated Sep. 12, 1990.
English Abstract of Japanese Docket No. 03–296467, dated Dec. 27, 1991.
English Abstract of Japanese Docket No. 06–99123, dated Apr. 12, 1994.

*Primary Examiner*—Shrive Beck
*Assistant Examiner*—Katherine A. Bareford
*Attorney, Agent, or Firm*—Oblon, Spivak, McClelland, Maier & Neustadt

[57]  ABSTRACT

In a coating method of extruding a coating liquid through a slit of an extrusion-type coating head to coat a running web, at a starting or restarting of the coating, the coating liquid is extruded through the slit of the coating head while the coating head is away from the web, and then the coating is started while a slightly large clearance is kept between the coating head and the web at the upstream side of the coating head, thereafter changing the coating state or arrangement to a steady coating state. Therefore, occurrence of a thicker portion of the coating film on the web at the start of the coating can be prevented. Further, at the end or interruption of the coating, the coating state or arrangement of the coating head is changed from the steady coating state to a state wherein a slightly large clearance is kept between the coating head and the web at the upstream side, and the coating head is moved away from the web to end the coating. Therefore, occurrence of a thicker portion of the coating film on the web at the end of the coating can be prevented. With this arrangement, at the start, restart, end and interruption of the coating, a uniformly coated film can be also formed on one surface of the web whose other surface has already been coated with a coating liquid.

7 Claims, 4 Drawing Sheets

COATING METHOD

BACKGROUND OF THE INVENTION

1. Field of the Invention

This invention relates to a coating method, and more particularly to a coating method of applying a coating liquid uniformly onto both sides of a web.

2. Description of Related Art

Various kinds of coating methods such as a roll coating method, a gravure coating method, a slide bead coating method and a doctor coating method have been conventionally used as a method of applying a coating liquid onto a web. However, an extrusion coating method has recently come to public attention as it provides a high productivity and a high operating performance, as well as an outstanding controllability of thickness of a coating film on the web.

In the extrusion coating method, an extrusion-type coating head first approaches a web, and then a coating liquid is extruded through a slit of the coating head onto the web to form a coating film, while the coating head and the web are spaced from each other with a clearance corresponding to a thickness of a film to be coated on the web. On coating the web by using said extrusion-type coating head, controlling the thickness of the coating film is unstable at the start of the coating wherein the coating head and the web move closer to each other, or at the end of the coating wherein the coating head and the web move away from each other. At these times, or at the unstable control times, the coating film is liable to become partially thicker, and thus a web feeding guide roll, etc., may be contaminated with the under-drying coating liquid of the thicker portion of the coating film on the web. Further, when magnetic coating liquid is used as a coating liquid for the manufacture of magnetic tapes or magnetic floppy discs, problems such as the occurrence of drop-out in products, reduction in yield, etc. have come up.

In order to prevent a coating film from becoming partially thicker in the extrusion coating method, the following various coating methods have already been proposed. For example, Japanese Laid-open Patent Application No. 2-229572 discloses a method wherein a thickness of a coating film is controlled with a solid smoother disposed at the downstream side of the coating head. Japanese Laid-open Patent Application No. 6-99123 discloses a coating method wherein a thicker portion of a coating film is scraped off and removed with a scraping roll disposed at the downstream side of a coating head. Japanese Laid-open Patent Application No. 62-95169 discloses a method wherein, at the start of coating a web, an extrusion of a coating liquid is started after a coating head has contacted with a web, and at the end of the coating, the extrusion of the coating liquid is stopped and after that the coating head moves away from the web, thereby preventing the coating film from becoming partially thicker. Further, Japanese Laid-open Patent Application No. 3-296467 discloses a method wherein an extrusion of a coating liquid begun after a back edge (it means an edge at the upstream side in the web feeding direction in this publication) of a coating head is approached to or slidably contacted with the web, and then a doctor edge (it means an edge at the downstream side in the web feeding direction in this publication) of the coating head is contacted with the web to prevent streaking on the coating film with chips which are scraped from the web on the edge of the coating head at the start of the coating.

However, in a double-side coating process using the extrusion coating head such as in the case where a coating film is formed on each of both sides of the web, that is, a first surface and a second surface, or an opposite side of said first surface, or in the case where a coating film is first formed on the first surface of the web by a coating method other than the extrusion coating method, and then a coating film is formed on the second surface of the web by using the extrusion coating method, the web cannot be supported by a support roll from the first surface side as the first surface per se has already been coated with a coating film. Hence, the occurrence of an increase in the thickness of the coating film on the second surface cannot be effectively prevented by using the smoother or the scraping roll as is disclosed in the Japanese Laid-open Patent Application Nos. 2-229572 and 6-99123, as said solid smoother or the scraping roll cannot be suficiently forced against the web because the web cannot be supported by the support roll from the opposite side of the film, and therefore the thicker portion of the film cannot be scraped off nor removed effectively by them.

In the method as disclosed in the Japanese Laid-open Patent Application No. 62-95169, at the start and the end of the coating, a coating head in a state of not extruding coating liquid is in contact with a running web in a solvent-vapor (volatile component) atmosphere of the coating liquid. Therefore, there is a danger that could cause an explosion and a problem that wear of the edge portion of the coating head accelerates.

A method disclosed in the Japanese Laid-open Patent Application NO. 3-296467 does not aim to prevent the increase in the thickness of a coating film at the start of the coating, and therefore no sufficient effects to prevent the increase in the thickness of a coating film are obtained. It also has no disclosure regarding the prevention of occurrence of the thicker portion when the coating head is separated from the web at the end of the coating.

SUMMARY OF THE INVENTION

An object of the present invention is to provide a coating method of applying a coating liquid onto a web, and particularly to provide a coating method of applying a coating liquid onto a second surface of the web in an extrusion double-side coating process, so as to effectively prevent the occurrence of any thicker portion of a coating film on the web at a start, a re-start, an end or an interruption of a coating operation.

In order to attain the above object, a coating method according to the present invention in which a coating liquid is extruded through a slit of an extrusion-type coating head onto a running web, comprises the steps of extruding a coating liquid through a slit of the coating head while the coating head is separated from the web, bringing the coating head into contact with the web so that an intersectional angle between the center line of the slit of the coating head and the web at the downstream side of the coating head is set to a predetermined outlet angle θo in a steady coating state, and an intersectional angle between the center line of the slit and the web at the upstream side of the coating head is set to be larger than a predetermined inlet angle θi in the steady coating state, setting the intersectional angle between the center line of the slit of the coating head and the web at the upstream side of the coating head to the predetermined inlet angle θi in the steady coating state to start or restart a coating operation, varying the intersectional angle between the center line of the slit of the coating head and the web at the upstream side of the coating head to be larger than the inlet angle θi while keeping the outlet angle θo to be unvaried at the end or interruption of the coating, and moving the coating head away from the web.

According to the coating method of the present invention, at the start or restart of the coating, the coating liquid is extruded through the slit of the coating head while the coating head is away from the web, and then the coating is started while a slightly large clearance is kept between the coating head and the web at the upstream side of the coating head, thereafter changing the coating state or arrangement to a steady coating state. Therefore, occurrence of a thicker portion of a coating film on the web at the start of the coating can be prevented. Further, at the end or the interruption of the coating, the coating state or arrangement of the coating head is changed from the steady coating state to a state wherein a slightly large clearance is kept between the coating head and the web at the upstream side, and the coating head is moved away from the web to end the coating. Therefore, occurrence of a thicker portion of the coating film on the web at the end of the coating can be prevented. With this arrangement, at the start, restart, end and interruption of the coating, an uniformly coated film can be formed on one surface of the web which has been already coated with the coating liquid on the other surface thereof.

DETAILED DESCRIPTION OF PREFERRED EMBODIMENTS

A preferred embodiment according to the present invention will be described hereunder with reference to the accompanied drawings.

Figure 1:
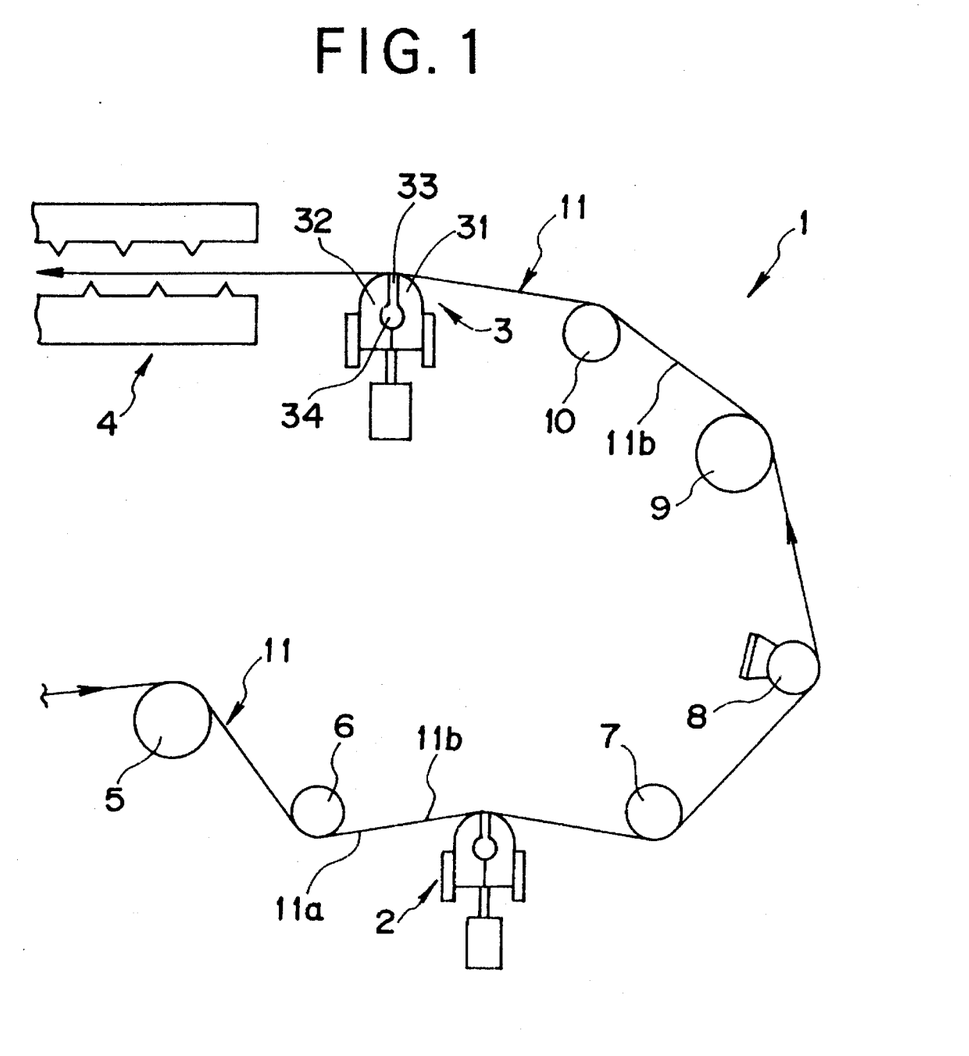
FIG. 1 is a schematic diagram showing a double-side coating apparatus to which a coating method of the present invention is applied.

FIG. 1 is a schematic diagram showing a double-side coating apparatus which is capable of implementing the coating method of the present invention. In FIG. 1, the double-side coating apparatus 1 includes a first coating head 2, a second coating head 3 and a drying device 4. In the double-side coating apparatus 1, a web 11 which is supplied from a supply roll (not shown) is guided to the first coating head 2 through a vacuum roll 5 and a support roll 6, and then coating liquid is coated on a first surface 11a of the web 11 by the first coating head 2. Subsequently, the web 11 is guided to the second coating head 3 while the other surface of the web 11, that is, a non-coated second surface 11b of the web 11, is supported by a support roll 7, a tension detection roll 8, a vacuum roll 9 and a support roll 10, and then the coating liquid is coated on the second surface 11b of the web 11 by the second coating head 3. The web 11, coated on both sides thereof as described above, is guided to the drying device 4 to dry the coating films on both, while it is supported in a non-contact state (that is, a non-contact drying process is carried out), and then the web 11 is taken up by a take-up roll (not shown).

In the above-mentioned double-side coating apparatus 1, at least the second coating head 3 is an extrusion-type coating head, comprising a front edge 31 (edge at the upstream side in the web feeding direction), a back edge 32 (edge at the upstream side in the web feeding direction), a slit 33 formed between the front edge 31 and the back edge 32, and a pocket (coating liquid reservoir) 34 intercommunicating with the slit 33.

The coating liquid is temporarily supplied to the pocket 34 from an external coating liquid supply system (not shown), and then extruded from the pocket 34 through the slit 33 while keeping an uniform flow amount along the direction of the width of the web, whereby the coating liquid is uniformly coated on the second surface 11b of the web 11. The second coating head 3 is designed to be approached to or separated from the web 11, and further it may be designed to be rotatable about the rotational axis which is in parallel with the width direction of the web 11. In addition, the support roll 10 which is located at the upstream side of the second coating head 3 and nearest to the second coating head 3 is also designed to be movable, so that the web feeding path of the web 11 is varied by the movement of the support roll 10.

Figure 2A:
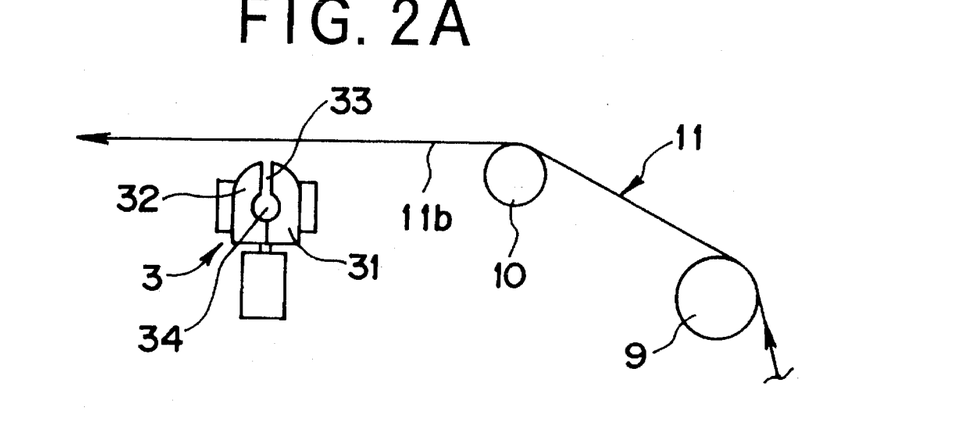
FIGS. 2A, 2B and 2C show variation of a state or arrangement of the double-side coating apparatus to which the coating method of the present invention is applied.
Figure 2B:
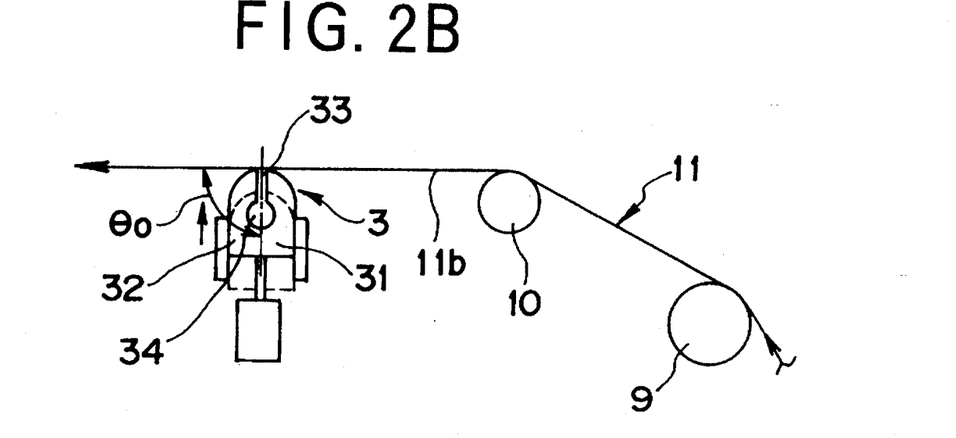
Figure 2C:
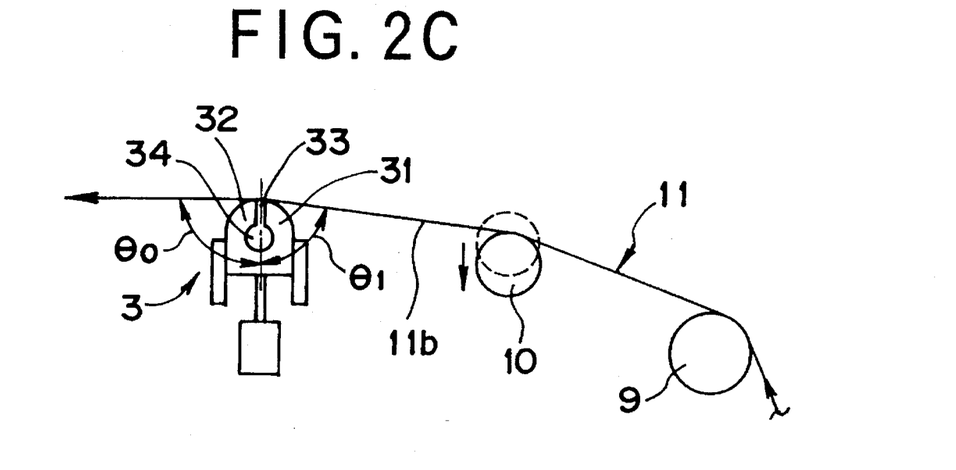
Figure 3A:
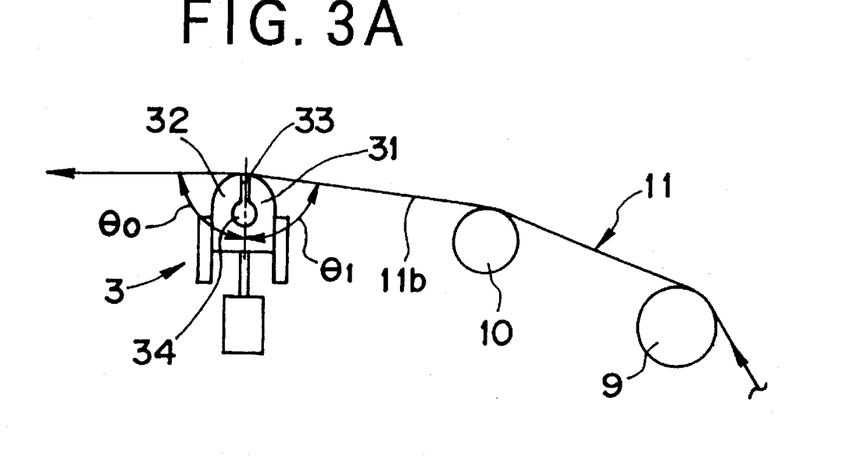
FIGS. 3A, 3B and 3C show variation of a state or arrangement of the double-side coating apparatus to which the coating method of the present invention is applied.
Figure 3B:
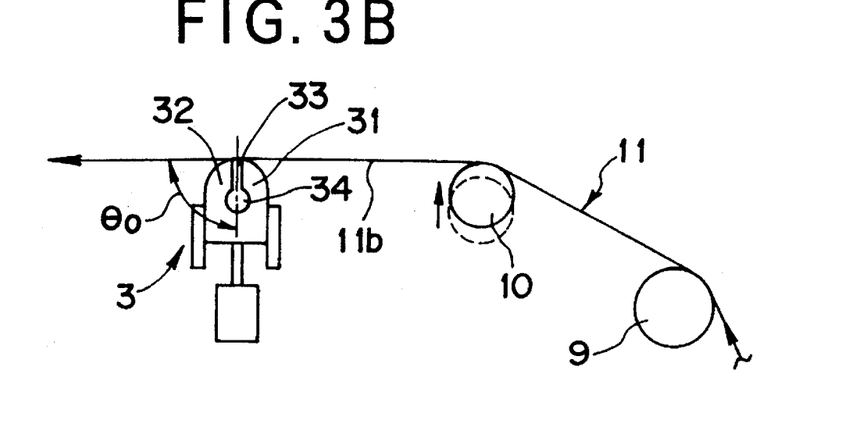

Next, the coating method of the present invention using the double-side coating apparatus 1 shown in FIG. 1 will be described with reference to FIGS. 2 and 3.

In a steady-coating state (arrangement), the double-side coating apparatus 1 is arranged in a state as shown in FIG. 1. On the other hand, in an intermitting state or an interruption of coating where a splice portion of the web 11 passes across the second coating head 3 which is separated from the web 11 as shown in FIG. 2A.

When the second coating head 3 starts or re-starts its coating operation in the above state, the second coating head 3 is set to a state where the coating liquid is extruded through the slit 33 of the second coating head 3. Subsequently, the second coating head 3 is moved (upwardly in FIGS. 2A to 2C) so that it is contacted with the second surface 11b of the web 11 by the coating liquid extruded therefrom (see FIG. 2B). This contact operation is carried out so that the running position (height) of the web 11 is kept in its horizontal feeding state in the drying device 4 located at the downstream side of the second coating head 3, and so that an applied load due to the pushing force of the second coating head 3 against the web 11 is negligible. Further, the contact between the second coating head 3 and the second surface 11b of the web 11 is performed so that an intersectional angle between the center line of the slit 33 of the second coating head 3 and the web 11 running in the downstream direction from the second coating head 3 is equal to a predetermined angle (outlet angle θo) in the steady coating state. In this case, the center line of the slit 33 of the second coating head 3 and the web 11 at the upstream side of the second coating head 3 intersect to each other substantially at an angle (180°−θo), and thus it is set to an angle larger than the angle in the steady coating state. With this arrangement, the clearance between the back edge 32 of the second coating head 3 and the web 11 is controlled, and a sufficient space is kept in the clearance between the front edge 31 of the second coating head 3 and the web 11. Accordingly, the coating liquid extruded from the upper end of the slit 33 of the second coating head 3 is allowed to partially leak to the upstream side of the second coating head 3, and thus the coating liquid can be prevented from being extruded to the second surface 11b of the web 11 at a sitting and being shifted to the downstream side of said coating head 3. According to this, an occurrence of a thicker portion can be suppressed.

Subsequently, the support roll 10 which is located at the upstream side of and nearest to the second coating head 3 is moved (downwardly in the figures) to reduce the intersectional angle between the center line of the slit 33 of the second coating head 3 and the web 11 at the upstream side of the second coating head 3 to a predetermined angle in the steady coating state and set the angle as an inlet angle θi (see FIG. 2C). With this arrangement, the outlet angle θo and the inlet angle θi are set to the predetermined angles which are suitable for the steady coating state, and a stable coating thickness can be obtained in a subsequent process.

The permissible angle range of the outlet angle θo and the inlet angle θi in the steady coating state is varied depending on the edge shape, viscosity of the coating liquid, web tension, thickness of the coating liquid, etc. For example, the outlet angle θo may be set to 75 to 105° and the inlet angle θi is set to 70 to 100°. Here, θo+θi<180°. Further, by designing the second coating head 3 to be rotatable about the rotational axis which is in parallel with the width direction of the web 11, the web 11 which is fed to the drying device 4 can be kept horizontally (in a fixed state) at all times irrespective of adjustment of the lap angle of the outlet angle and the inlet angle.

As described above, the coating method of the present invention can effectively prevent any increase in the thickness of the film at the start or re-start of the coating by using the extrusion-type coating head to the second surface 11b of the web 11 which cannot be supported at the first surface 11a a side thereof by the support roll 10 because a coating film has been already formed on the first surface 11a.

If the outlet angle θo and the inlet angle θi are deviated from proper angle ranges, the supply of the coating liquid from the second coating head 3 to the web 11 could not be normally performed, or the coating liquid on the web 11 would be scraped off by the back edge 32 of the second coating head 3, or ribbing would occur. Further, the web feeding speed may be set in consideration of the viscosity of the coating liquid, the thickness of the coating film, etc., and it is preferably set to 10 to 1000 m/min.

Next, the coating method at the end or interruption of the coating of the second coating head 3 will be described.

When the coating operation of the second coating head is ended or interrupted in the steady coating state (FIG. 3A), the operation carried out at the start or restart of the coating is reversely carried out. That is, the support roll 10 is first moved upwardly as shown in the figures to to set the intersectional angle between the center line of the slit of the second coating head 3 and the web 11 at the upstream side thereof to be larger than the inlet angle θi in the steady coating state (FIG. 3B). At this time, the outlet angle θo is left unchanged, and thus the second coating head 3 and the web 11 are arranged so that the clearance between the back edge 32 of the second coating head 3 and the web 11 is set to controlled to have a space corresponding to the thickness of the coating film and a sufficient space is kept in the clearance between the front edge 31 of the second coating head 3 and the web 11.

Figure 3C:
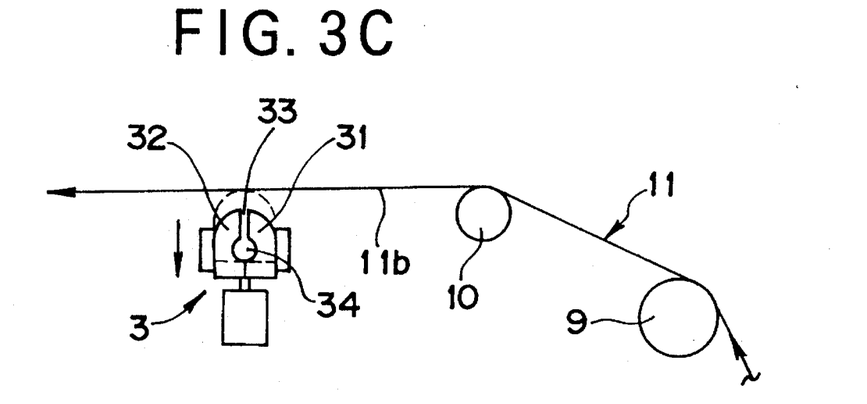

In this state, the second coating head 3 is subsequently moved away from the web 11 (FIG. 3C). At this time, the second coating head 3 is arranged so that the coating liquid is still extruded through the slit 33 of the second coating head 3. However, since the relationship between the outlet angle θo and the intersectional angle between the second coating head 3 and the web 11 at the upstream side is set as described above, the coating liquid extruded through the slit 33 of the second coating head 3 partially leaks to the upstream side of the second coating head 3, and thus the coating liquid extruded through the second coating head 3 is prevented from being wholly shifted to the second surface 11b of the web 11 in a lump. Therefore, an occurrence of the thicker portion on the web 11 can be prevented.

The extrusion of the coating liquid from the second coating head 3 is stopped after the second coating head 3 is perfectly separated from the web 11. Through this operation, the second coating head 3 in which no coating liquid is extruded can be prevented from being directly contacted with the web 11 in an atmosphere of solvent (volatile component) vapor of the coating liquid.

Accordingly, at the start or restart of the coating or at the end or interruption of the coating, the coating method of the present invention can effectively prevent occurrence of a thicker portion on the web which cannot be supported by the support roll 10 from the first surface 11a side as the coating film has been already formed on the first surface 11a of the web 11 by the first coating head 2.

The double-side coating apparatus to which the coating method of this invention is applicable is not limited to the coating apparatus as described above.

Plastic film such as polyethylene terephthalate or the like, longitudinal flexible support such as paper, metal foil or the like may be used as the web usable in this invention, and the web material is not limited to special material. Further, the web may be beforehand provided with various treated layers thereon.

Any material may be used as the coating liquid used in this invention insofar as it is suitable for the coating by the extrusion-type coating head. The extrusion-type coating method is excellent in controllability of the thickness of a coating film, and thus it has been applied to fields which require the uniform and stable film coating (film thickness). For example, it is applied to formation of magnetic recording layers or back coat layers for magnetic recording media, and magnetic coating liquid containing magnetic powder, binder and solvent, or coating liquid for back coat may be used in this invention.

As the magnetic powder may be used oxide fine powder such as $\gamma$-$FeO_3$, Co-contained $\gamma$-$Fe_2O_3$, $Fe_3O_4$, Co-contained $Fe_3O_4$, $CrO_2$, barium ferrite, strontium ferrite, etc., metals such as Fe, Co, Ni or alloy fine powder of these metals, iron carbide, etc. Further, as the binder may be used various kinds of well-known resin binders. No special restriction is imposed on the solvent. For example, keton-based solvent such as cyclohexanone, methyl ethyl ketone, methyl isobutyl ketone or the like, aromatic-based solvent such as toluene or the like may be suitably selectively used in accordance with its use purpose.

The magnetic coating liquid may be added with inorganic fine particles, various kinds of additives such as lubricant, etc., if desired. The magnetic recording layer which is formed using the magnetic coating liquid as described above is formed at a thickness of about 0.1 to 6 μm in a dry state, and the occupational rate of the magnetic powder in the magnetic recording layer is preferably set to 30 to 92 wt %. Further, the coating liquid may be multi-layered in a wet state and then coated on a web, which has been recently frequently used. In this case, the coating liquid is not limited to the magnetic liquid, and it may be any material such as non-magnetic liquid, solution of resin or the like insofar as it is suitably used for the extrusion-type coating head. The layer structure of the coating layer may be varied in accordance with its use purpose.

The following materials may be used for the coating liquid for the back coat. As pigment may used non-magnetic inorganic powder such as carbon black, $\gamma$-$Fe_2O_3$, $TiO_2$, $CaO$, $SiO_2$, $Cr_2O_3$, $\alpha$-$Al_2O_3$, $SiC$, $CaCO_3$, $BaSO_4$, $ZnO$, $MgO$, boron nitride, TiC or the like. As binder may be use any kind of resin binder. Further, no striction is imposed on solvent. For example, keton-based solvent such as cyclohexanone, methyl ethyl ketone, methyl isobutyl ketone or the like, aromatic-based solvent such as toluene or the like may be suitably selectively used according to its use purpose. The coating liquid for the back coat may be added with inorganic fine particles, various kinds of additives such as lubricant, etc. if required. The back coat layer which is formed using the back-coat coating liquid as described above is formed at a thickness of about 0.1 to 1.0 μm in a dry state, and the occupational rate of the pigment in the back-coat layer is preferably set to 30 to 80 wt %.

In this invention, the first coating head may be an extrusion-type coating head like the second coating head, and it may be a coating head using another type of coating method such as a roll coating method or the like. When the first coating head comprises an extrusion-type coating head, the coating method of this invention is applied to the first coating head to prevent occurrence of the thicker portion of a coating film on the web at the start or end of the coating. Further, a well known solid smoother or scraping roll may be disposed at the downstream side of the first coating head and at the upstream side of the second coating head to prevent the occurrence of the thicker portion of a coating film on the web at the start or end of the coating of the first coating head.

This invention will be described in more detail using some embodiments below.

Polyethylene terephthalate films having 520 mm width and 1 4 μm thickness were prepared, and magnetic coating liquid and coating liquid for back coat were also prepared with the following components.

|  | part(s) by weight |
| --- | --- |
| (Magnetic coating liquid) | |
| Co-contained $\gamma$-$Fe_2O_3$ | 100 |
| vinyl chloride-acrylate copolymer containing polar group | 15 |
| polyurethane resin containing sulfonic acid group | 6 |
| | (in terms of solid) |
| dispersant | 1.5 |
| stearic acid | 1 |
| butyl stearate | 1 |
| $\alpha$-alumina | 2 |
| methyl ethyl ketone | 160 |
| toluene | 40 |
| cyclohexanone | 100 |
| hardener (C-3041 NV50% produced by Nihon Polyurethane Kogyo Co., Ltd.) | 8.4 |
| (Coating liquid for back coat) | |
| carbon black (center particle diameter 21 nm) | 80 |
| vinyl chloride-vinyl acetate-vinyl alcohol copolymer | 65 |
| polyurethane resin containing sulfonic acid group | 35 |
| methyl ethyl ketone | 470 |
| toluene | 470 |
| cyclohexanone | 470 |
| stearic acid | 1 |
| myristic acid | 1 |

-continued

|  | part(s) by weight |
| --- | --- |
| butyl stearate | 2 |
| hardener (C-3041 NV50% produced by Nihon Polyurethane Kogyo Co., Ltd.) | 30 |

Preparation of Samples 1 and 2

The magnetic coating liquid as described above was coated on the first surface 11a of the web 11 by the first coating head 2 (extrusion-type coating head) under the following condition using the double-side coating apparatus as shown in FIG. 1. Therefore, the coating liquid for back coat as described above was coated on the second surface 11b of the web 11 by the second coating head 3 (extrusion-type coating head) according to an operating procedure 1 of this invention (as described later), and then the web 11 was dried to form a magnetic recording medium having a magnetic recording layer on the first surface 11a of the web 11 and a back coat layer on the second surface 11b of the web 11 (sample 1, sample 2).

Figure 4:
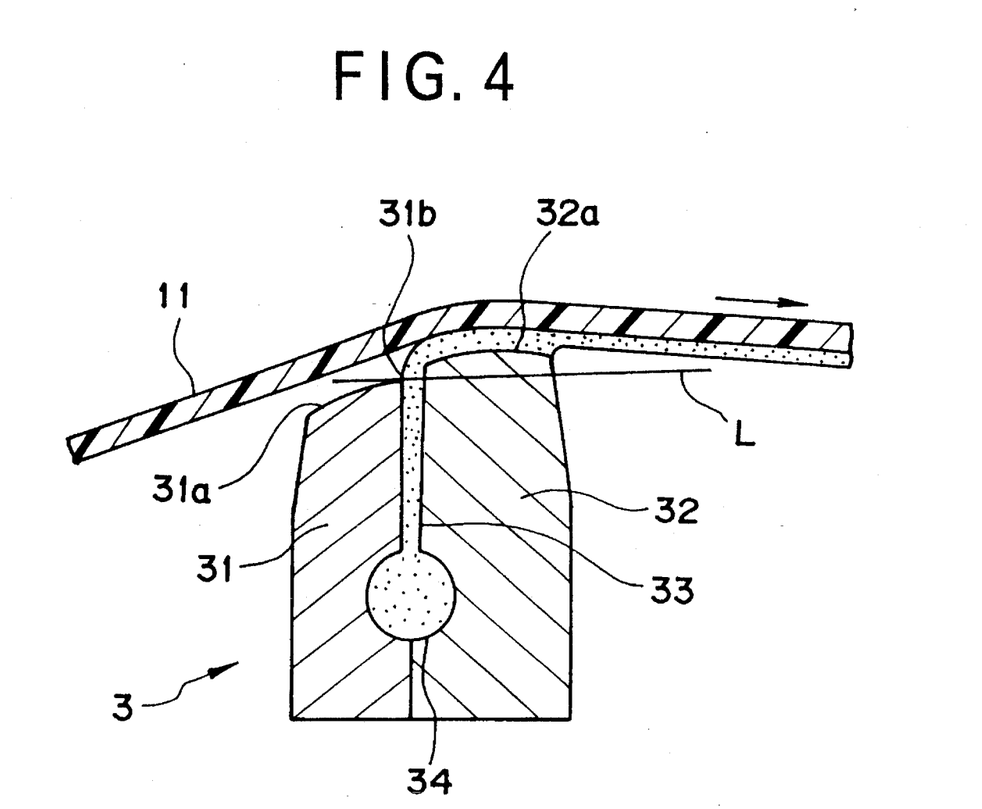
FIG. 4 is a cross-sectional view showing a coating head used in the coating method according to the present invention.

A coating head having the sectional shape as shown in FIG. 4 was used as each of the first coating head 2 and the second coating head 3. In the coating head 3, the back edge surface 32a corresponding to the upper end surface of the back edge 32 was designed to have a round surface (R-surface shape) and so that the R-surface portion of the back edge surface 32a was located at a position higher than a tangential line L drawn to the front edge surface 31a at the edge point 31b of the slit 33 side of the front edge 31 of the coating head 3 so as to project toward the web 11 side. The radius of curvature (R) of the R-surface portion of the back edge face 32a was set to 5 mm.

(Coating Condition)

web feeding speed: 100 m/min and 300 m/min web tension : first coating head 20 kg/width second coating head 15 kg/width extrusion amount of the first coating head: 800 cc/min and 2400 cc/min extrusion amount of the second coating head: 400 cc/min and 1200 cc/min (Operating procedure 1)

In the coating process as described above, a solid smoother was disposed at the downstream side of the first coating head 2 and near to the support roll 7 to prevent occurrence of a thicker portion on the web at the start and end of the coating. On the other hand, at the start of coating the second surface 11 with coating liquid by the second coating head 3, the second coating head 3 from which the coating liquid for back coat was being extruded was first moved (upwardly) so that the top end portion of the edge was located on the extension line of the center line of the drying device 4, whereby the second coating head 3 was contacted with the web 11, and the outlet angle θo of the second coating head 3 was set to 94.2°. Thereafter, the support roll 10 at the upstream side of the second coating head 3 was moved (downwardly) and the angle between the web 11 and the second coating head 3 (inlet angle θi) was set to 73.9°, and the coating operation was performed in the steady coating state. Further, at the end of the coating the second surface 11b of the web with a coating liquid by the second coating head 3, inversely to the operation at the start of the coating, the support roll 10 at the upstream side of the second coating head 3 was moved (upwardly) so as to set the inlet angle θi to be larger than that in the steady coating state. Thereafter, the second coating head 3 from which the coating liquid for back coat was being extruded was moved (downwardly) so as to perfectly separate the second coating head 3 from the web 11, and then the extrusion of the back-coating liquid was stopped.

Preparation of Comparative Samples 1 and 2

The magnetic recording media (comparative samples 1, 2) were prepared in the same manner as the samples 1 and 2 except that the following operating procedure 2 for coating was used.

(Operating Procedure 2)

At the start of coating the second surface 11b of the web 11 by the second coating head 3, the support roll 10 was first moved (downwardly), and then the second coating head 3 from which the back-coat coating liquid was being extruded was moved (upwardly). At the end of coating the second surface by the second coating head 3, the second coating head 3 from which the back-coat coating liquid was being extruded was moved (downwardly), and then the support roll 10 was moved (upwardly).

Preparation of Comparative samples 3 and 4

The magnetic recording media (comparative samples 3 and 4) were prepared in the same manner as the samples 1 and 2 except that the following operating procedure 3 for coating was used.

(Operating Procedure 3)

The support roll was fixed to the position of the support roll in the steady coating state for preparation of the sample 1, and only the second coating head 1 from which the back-coat coating liquid was being extruded was moved (upwardly or downwardly) to perform the coating operation of the second surface by the second coating head 3 at the start and the end of the coating.

For the magnetic recording media (samples 1, 2 and comparative samples 1 to 4) thus prepared, it was checked whether the guide roll was contaminated with the coating liquid due to under-drying in a drier. The results are shown in Table 1. In correspondence to the web feeding speed, the time for passing through the drier of each of the sample 1, the comparative sample 1 and the comparative sample 3 was set to three times of that of each of the sample 2, the comparative sample 2 and the comparative sample 4.

TABLE 1

| A | B | C | D | E | F |
|---|---|---|---|---|---|
| SAMPLE 1 | 1 | 100 | 800 | 400 | NO |
| SAMPLE 2 | 1 | 300 | 2400 | 1200 | NO |
| C. S. 1 | 2 | 100 | 800 | 400 | NO |
| C. S. 2 | 2 | 300 | 2400 | 1200 | YES |
| C. S. 3 | 3 | 100 | 800 | 400 | NO |
| C. S. 4 | 3 | 300 | 2400 | 1200 | YES |

A: magnetic recording medium,
B: operating procedure,
C: web feeding speed (m/min),
D: extrusion amount of the first coating head (cc/min),
E: extrusion amount of the second coating head (cc/min),
F: occurrence of contamination of guide roll with coating liquid,
C. S. 1 to C. S. 4: comparative samples 1 to 4.

As shown in Table 1, the samples 1 and 2 which were prepared according to the operating procedure 1 of this invention were excellently dried in the drier irrespective of the web feeding speed, and no contamination occurred in the web feeding guide roll at the downstream side of the drier. On the other hand, for the comparative samples which were prepared according to the operating procedures 1 and 2, although no contamination was found out for the comparative samples at the low web feeding speed (comparative samples 1, 3), a contamination with the under-dried coating liquid of the sample was found for the comparative samples at the high web feeding speed (comparative samples 2, 4).

As described above, according to the coating method of the present invention, at the start, restart, end and interruption of the coating, a coating film can be uniformly formed on one surface of a web which has been already coated with the coating liquid on the other surface thereof, and occurrence of the thicker portion of the coating film on the web can be effectively prevented. With this effect, the contamination with the under-dried coating liquid of the coating film on the web can also be prevented from occurring in the guide roll at the downstream side of the extrusion-type coating head, and the thickness-uniform coating operation can be performed.

This invention is not limited to the above embodiments, and various modifications may be made without departing from the subject matter of this invention. Accordingly, the present examples and embodiments are to be considered as illustrative and not restrictive, and the invention is not to be limited to the details given herein, but may be modified within the scope of the appended claims. Further, any modification and alteration which are equivalent to the scope of the appended claims are within the scope of the appended claims.

What is claimed is:

1. A coating method of extruding a coating liquid through a slit of an extrusion coating head to coat a running web, comprising the steps of:

extruding the coating liquid through the slit of the coating head while the coating head is spaced from the web;

bringing the coating head into contact with the web so that an intersectional angle between a center line of the slit of the coating head and the web at a downstream side of the coating head is set to an outlet angle θo in a steady coating state, and an intersectional angle between the center line of the slit and the web at an upstream side of the coating head is set to be larger than an inlet angle θi in the steady coating state;

setting the intersectional angle between the center line of the slit of the coating head and the web at the upstream side of the coating head to the inlet angle θi in the steady coating state to start or restart a coating operation;

varying the intersectional angle between the center line of the slit of the coating head and the web at the upstream side of the coating head to be larger than the inlet angle θi while keeping the outlet angle θo to be unvaried at the end or interruption of the coating; and moving the coating head away from the web.

2. The coating method as claimed in claim 1, further comprising the step of stopping the extrusion of the coating liquid from the coating head after the coating head is perfectly separated from the web.

3. The coating method as claimed in claim 1, wherein the outlet angle θo in the steady coating state is set to 75° to 105° and the inlet angle θi in the steady coating state is set to 70° to 100°, where θo+θi<180°.

4. The coating method as claimed in claim 1, wherein the coating operation is performed by said coating head for one surface of the web which has been already coated with a coating liquid on another surface thereof by an upstream coating head.

5. The coating method as claimed in claim 4, wherein the upstream coating head comprises an extrusion coating head.

6. The coating method as claimed in claim 5, wherein the coating liquid used in the upstream coating head contains at least a magnetic coating liquid.

7. The coating method as claimed in claim 4, wherein the coating liquid used in the upstream coating head contains at least a magnetic coating liquid.

* * * * *